US009959296B1

(12) United States Patent
Gubin et al.

(10) Patent No.: US 9,959,296 B1
(45) Date of Patent: May 1, 2018

(54) PROVIDING SUGGESTIONS WITHIN A DOCUMENT

(71) Applicant: Google Inc., Mountain View, CA (US)

(72) Inventors: Maxim Gubin, Walnut Creek, CA (US); Kenneth W. Dauber, Palo Alto, CA (US); Sangsoo Sung, Palo Alto, CA (US); Krishna Bharat, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 906 days.

(21) Appl. No.: 14/275,333

(22) Filed: May 12, 2014

(51) Int. Cl.
G06F 17/30 (2006.01)

(52) U.S. Cl.
CPC .. G06F 17/30309 (2013.01); G06F 17/30539 (2013.01)

(58) Field of Classification Search
None
See application file for complete search history.

(56) References Cited

U.S. PATENT DOCUMENTS

| 5,469,538 | A | 11/1995 | Razdow |
| 5,557,723 | A | 9/1996 | Holt |
| 5,754,737 | A | 5/1998 | Gipson |
| 6,256,633 | B1 | 7/2001 | Dharap |
| 6,564,213 | B1 | 5/2003 | Ortega |
| 6,918,086 | B2 | 7/2005 | Rogson |
| 7,113,950 | B2 | 9/2006 | Brill |
| 7,249,123 | B2 | 7/2007 | Elder |

(Continued)

FOREIGN PATENT DOCUMENTS

| CA | 2711081 A1 | 1/2011 |
| EP | 843266 A3 | 1/2000 |

(Continued)

OTHER PUBLICATIONS

"Lemma What? A Guide to Text Processing and Machine Learning API Terms" [online] [retrieved Apr. 7, 2014]. http://blog.mashape.com/post/50655824209/lemma-what-a-guide-to-text-processing-and-machine, 5 pages.

(Continued)

Primary Examiner — Son T Hoang
(74) Attorney, Agent, or Firm — Fish & Richardson P.C.

(57) ABSTRACT

Methods, systems, and apparatus, including computer programs encoded on a computer storage medium, for providing suggestions within a document. In one aspect, a method includes obtaining textual input provided to a document editing application by a user device, the textual input being provided to the document editing application for inclusion in a document; identifying performance measures associated with the current editing session for the document, each performance measure being based on session data obtained from the user device during a document editing session, the session data being for the textual input and prior text that was included in the document prior to the textual input; providing the performance measures as input to a suggestion model that was trained using historical performance measures identified in performance logs for historical document editing sessions of users; and throttling textual suggestions during the current editing session based on the output of the suggestion model.

18 Claims, 4 Drawing Sheets

(56) References Cited

U.S. PATENT DOCUMENTS

| | | | |
|---|---|---|---|
| 7,451,397 | B2 | 11/2008 | Weber |
| 7,487,456 | B2 | 2/2009 | Brooke |
| 7,630,980 | B2 | 12/2009 | Parikh |
| 7,660,806 | B2 | 2/2010 | Brill |
| 7,672,833 | B2 | 3/2010 | Blume |
| 7,751,533 | B2 | 7/2010 | Maekelae |
| 7,752,148 | B2 | 7/2010 | Yu |
| 7,805,492 | B1 | 9/2010 | Thatcher |
| 7,930,302 | B2 | 4/2011 | Bandaru |
| 7,984,035 | B2 | 7/2011 | Levin |
| 7,996,419 | B2 | 8/2011 | Pfleger |
| 8,073,877 | B2 | 12/2011 | Irmak |
| 8,185,448 | B1 | 5/2012 | Myslinski |
| 8,321,410 | B1 | 11/2012 | Bharat |
| 8,386,241 | B2 | 2/2013 | Goud |
| 8,386,926 | B1 | 2/2013 | Matsuoka |
| 8,423,424 | B2 | 4/2013 | Myslinski |
| 8,429,099 | B1 | 4/2013 | Perkowitz |
| 8,441,377 | B2 | 5/2013 | Liu |
| 8,452,799 | B2 | 5/2013 | Zhou |
| 8,458,046 | B2 | 6/2013 | Myslinski |
| 8,510,173 | B2 | 8/2013 | Myslinski |
| 8,521,764 | B2 | 8/2013 | Pfleger |
| 8,594,996 | B2 | 11/2013 | Liang |
| 2002/0156816 | A1 | 10/2002 | Kantrowitz |
| 2006/0235873 | A1 | 10/2006 | Thomas |
| 2007/0174255 | A1 | 7/2007 | Sravanapudi |
| 2008/0126075 | A1 | 5/2008 | Thorn |
| 2008/0195388 | A1* | 8/2008 | Bower .................. G06F 3/0237 704/243 |
| 2009/0083028 | A1 | 3/2009 | Davtchev |
| 2009/0099901 | A1 | 4/2009 | Sah |
| 2010/0286979 | A1 | 11/2010 | Zangvil |
| 2011/0184730 | A1* | 7/2011 | LeBeau .................. G10L 15/30 704/201 |
| 2011/0201387 | A1* | 8/2011 | Paek .................. G06F 3/0237 455/566 |
| 2011/0246575 | A1* | 10/2011 | Murayama ........ G06F 17/30011 709/204 |
| 2012/0239381 | A1 | 9/2012 | Heidasch |
| 2013/0031106 | A1 | 1/2013 | Schechter |
| 2013/0060560 | A1 | 3/2013 | Mahkovec |
| 2013/0151240 | A1 | 6/2013 | Myslinski |
| 2013/0173604 | A1 | 7/2013 | Li |
| 2013/0198115 | A1* | 8/2013 | Paek .................. G06F 3/04886 706/12 |
| 2013/0198163 | A1 | 8/2013 | Slezak |
| 2013/0212111 | A1 | 8/2013 | Chashchin |
| 2013/0226935 | A1 | 8/2013 | Bai |
| 2013/0332822 | A1 | 12/2013 | Willmore |

FOREIGN PATENT DOCUMENTS

| | | |
|---|---|---|
| EP | 1887451 A2 | 2/2008 |
| EP | 2053526 A1 | 4/2009 |
| EP | 2280332 A1 | 2/2011 |
| EP | 2639673 A1 | 9/2013 |
| WO | WO2004092979 A3 | 10/2005 |
| WO | WO2008120042 A1 | 10/2008 |

OTHER PUBLICATIONS

Lewis, David D. et al, [online] [retrieved on Apr. 7, 2014]. "A Comparison of Two Learning Algorithms for Text Categorization" http://citeseerx.ist.psu.edu/viewdoc/download?doi=10.1.1.49.860 &rep=rep1&type=pdf, 14 pages.

Ruiz-Casado, et al., "From Wikipedia to Semantic Relationships: a Semi-automated Annotation Approach" [online] [retrieved on Apr. 7, 2014]. http://citeseerx.ist.psu.edu/viewdoc/download?doi=10.1.1.84.899&rep=rep1&type=pdf, 14 pages.

Tran et al., "Automatic Detection of Outdated Information in Wikipedia Infoboxes," [online] [retrieved on Apr. 7, 2014]. Retrieved from: http://pics.cicling.org/2013/rcs/Automatic%20Detection%20of%20Outdated%20Information%20in%20Wikipedia%20Infoboxes.pdf, 12 pages.

Office, "Insert and format field codes in Word 2007," [online] [retrieved on Apr. 7, 2014]. Retrieved from: http://office.microsoft.com/en-us/word-help/insert-and-format-field-codes-in-word-2007-HA010338798.aspx? CTT=5&origin=HA010100426#BM5, 5 pages.

Microsoft Support, "The Filename field does not automatically update when you open a document in Word" [online] [retrieved on Apr. 7, 2014]. Retrieved from: http://support.microsoft.com/kb/832897, 2 pages.

dunxd.com "Word 2010 Template with Auto-updating fields," [online] [retrieved Apr. 7, 2014]. Retrieved from: http://dunxd.com/2012/08/08/word-2010-template-with-auto-updating-fields/, 2 pages.

* cited by examiner

PROVIDING SUGGESTIONS WITHIN A DOCUMENT

BACKGROUND

This specification relates to providing suggestions within a document.

Document editing applications provide authors with many tools to assist users with drafting documents, such as word processing documents, e-mail messages, and network blog posts. The assistance provided by these tools varies greatly, from design assistance tools for designing layouts and formatting text, to revision tracking tools for tracking document changes. Other tools provide assistance based on the text included in the document, such as spell checking tools that check text for spelling errors, and grammar check tools that check text for grammatical errors. Each tool provided by a document editing application is generally designed to enhance the user's experience in drafting a document.

SUMMARY

This specification describes technologies relating to providing suggestions for inclusion in a document.

In general, one innovative aspect of the subject matter described in this specification can be embodied in methods that include the actions of obtaining, during a current editing session, textual input provided to a document editing application by a user device, the textual input being provided to the document editing application for inclusion in a document; identifying, during the current editing session, one or more performance measures associated with the current editing session for the document, each performance measure being based on session data obtained from the user device during a document editing session, the session data being for the textual input and prior text that was included in the document prior to the textual input; providing the one or more performance measures as input to a suggestion model that was trained using historical performance measures identified in performance logs for a plurality of historical document editing sessions of a plurality of users; and throttling textual suggestions during the current editing session based on the output of the suggestion model, each textual suggestion comprising one or more words to be suggested for inclusion in the document. Other embodiments of this aspect include corresponding systems, apparatus, and computer programs, configured to perform the actions of the methods, encoded on computer storage devices.

These and other embodiments can each optionally include one or more of the following features. The method may further include accessing performance logs for the plurality of historical document editing sessions of the plurality of users, each performance log including historical performance measures for the historical document editing session; and training the suggestion model based on the historical performance measures and historical suggestions included in the performance logs.

Training the suggestion model may include: determining, based on the historical performance measures and historical suggestions included in the performance logs, a relation between a user typing speed and a rate of historical suggestion acceptance; and training the suggestion model based on the relation.

Training the suggestion model may include: determining, based on the historical performance measures and historical suggestions included in the performance logs, a relation between a user device latency and a rate of historical suggestion acceptance; and training the suggestion model based on the relation.

Training the suggestion model may include: determining, based on the historical performance measures and historical suggestions included in the performance logs, a relation between a suggestion confidence score and a rate of historical suggestion acceptance; and training the suggestion model based on the relation.

The one or more performance measures may include one or more of: a user typing speed; a user device latency; or a rate of suggestion acceptance that specifies a rate of acceptance for previous suggestions that were provided during the document editing session for the prior text that was included in the document prior to the textual input.

Each textual suggestion may have a suggestion confidence score indicating a likelihood that the textual suggestion will be included in the document; the output of the suggestion model may be a confidence score threshold; and throttling textual suggestions may include providing a textual suggestion to the user device only in response to the textual suggestion having a suggestion confidence score that meets the confidence score threshold.

The one or more performance measures may include a rate of acceptance for previous suggestions that were provided during the document editing session for the prior text that was included in the document prior to the textual input; and the confidence score threshold provided by the suggestion model may depend on the rate of acceptance for previous suggestions.

The one or more performance measures may include a user device latency that specifies a communications delay between the user device and the document editing application; the output of the suggestion model may be a latency threshold; and throttling textual suggestions may include providing textual suggestions to the user device only in response to the user device latency meeting the latency threshold.

The one or more performance measures may include a user typing speed that specifies a speed at which the user device provides textual input to the document editing application; the output of the suggestion model may be a typing speed threshold; and throttling textual suggestions may include providing textual suggestion to the user device only in response to the user typing speed meeting the typing speed threshold.

The document editing application may be one of a plurality of document editing applications, and the suggestion model was trained using historical performance measures identified in performance logs for the document editing application.

The document editing session from which session data is obtained may be the current editing session.

Particular embodiments of the subject matter described in this specification can be implemented so as to realize one or more of the following advantages. Providing suggestions for inclusion in a document may reduce the need for users to manually draft portions of a document. A user may forget, or be unaware of, various facts or other information that the user wishes to include in a document, and a suggestion system may be able to assist the user by providing them with information the user needs, without requiring explicit user requests for assistance. Using suggestion models to predict if and when suggestions should be provided to a user device may increase the likelihood of helpful suggestions being provided to users. Users who respond positively to suggestions and/or have devices and drafting abilities conducive to receiving suggestions may receive more suggestions, while users who respond negatively to suggestions and/or have devices and drafting abilities less conducive to receiving suggestions may receive less, both of which may improve users' suggestion experience. In addition, the workload of a suggestion system may be more appropriately matched to the needs of users, leading to potential efficiency gains for the suggestion system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
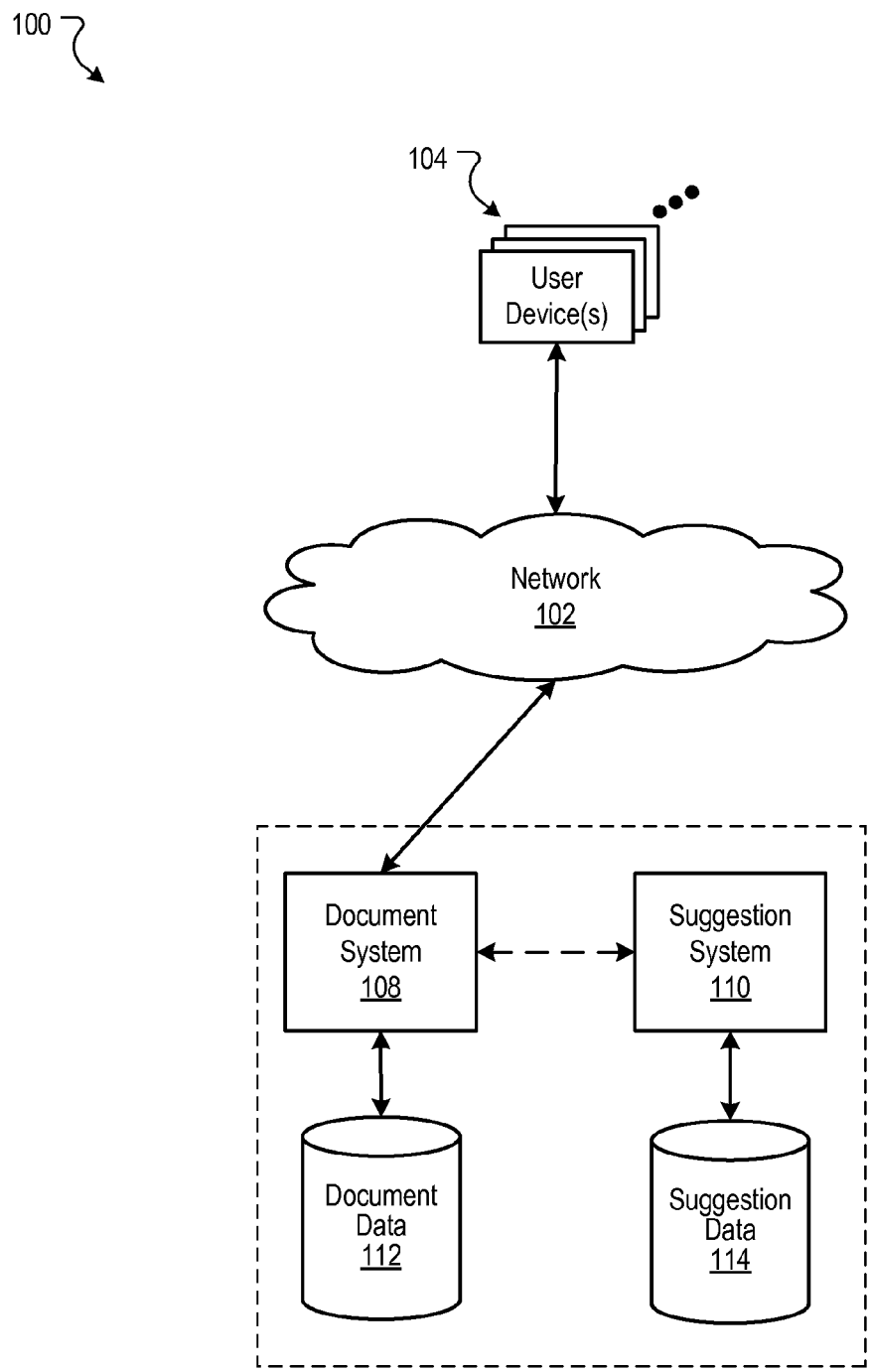
FIG. 1 is a block diagram of an example environment in which suggestions are provided for a document.

A suggestion system provides suggestions, e.g., autocompletions, for users editing documents. A document is a computer file containing text, such as a word processing document, an e-mail message, a blog post, an SMS or similar text message, or a web page, as well as text entry fields in applications and the like. Users may edit documents using a document editing application, including, for example, a word processor application, an e-mail client application, a web-based blogging application, etc. A suggestion system may use information from various sources to assist a user in drafting and/or editing a document by providing suggestions. Suggestions may range in size from suggested characters, words, phrases, sentences, paragraphs, formulas, abbreviations, symbols, or more. As used herein, a "word" or "words" may encompass any of the foregoing, e.g., a suggested "word" may be one or more characters, words, phrases, sentences, paragraphs, formulas, abbreviations, symbols, etc. Whether suggestions are provided or not, how they are provided, and the content of the suggestions depend on various types of information related to, for example, the user editing the document, existing text included in the document, current text being inserted by the user, user data related to the user editing the document, information regarding other users and/or documents of other users, and/or other information.

In an example implementation, a document editing application uses a suggestion system to provide textual suggestions, e.g., autocomplete suggestions, to a user device providing input to the editing application. The textual suggestions may depend upon user data for the user device, and may include both custom and general suggestions, e.g., a mix of custom suggestions based on historical activity and/or personalized user data associated with the user device and general suggestions based on either or both of device-independent information and information associated with multiple user devices. The textual suggestions may be throttled based on various performance metrics identified for the current document editing session. Throttling suggestions may include, for example, reducing or increasing the likelihood that a textual suggestion will be provided for the current editing session or preventing textual suggestions from being provided at all.

In operation, the document editing application, such as a word processing application or e-mail drafting application, obtains, during a current editing session, e.g., while the word processing document or e-mail is open for editing, textual input from a user device. The textual input may be, for example, characters, words, and phrases that are inserted into a document or e-mail. To determine whether and/or how often textual suggestions will be provided to a user device, the document editing application may identify session specific performance measures for the document during the current editing session. Performance measures may include, for example, a user typing speed, a user device connection speed, and/or an acceptance rate for previous suggestions, and each performance measure may be identified from prior text that was included in the document before the textual input. A user typing speed, for example, may indicate the number of words per minute being provided by the user device as document input, while the user device connection speed may indicate a latency for communications between the user device and the data processing apparatus running the document editing application.

The performance measures may be provided to a suggestion model that is trained to predict whether or not a suggestion should be provided. The model may be trained based on historical performance measures obtained from logs of previous user sessions, of the current user and/or other users. For example, an increase in typing speed may reduce the likelihood or frequency of suggestions if historical data indicates that suggestions are less likely to be used as typing speed increases. As another example, if a connection speed is slow, the likelihood or frequency of suggestions may be decreased as historical data may indicate that slower connection speeds lead to less suggestions being selected by users. Based on the output of the suggestion model, textual suggestions may be throttled during the current editing session. For example, if the performance measures for the current editing session indicate that suggestions are rarely selected, the document editing application may only provide suggestions that have a high confidence of being selected.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content item management system that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content item management system.

These features and additional features are described in more detail below.

FIG. 1 is a block diagram of an example environment 100 in which suggestions are provided for a document. A computer network 102, such as a local area network (LAN), wide area network (WAN), the Internet, or a combination thereof, connects user devices 104 to a document system 108. The online environment 100 may include any number of user devices 104. In some implementations, connections between user devices 104 and the document system 108 may be local, e.g., the document system 108 may be part of or directly connected to a user device rather than connected across the network 102.

A user device 104 is an electronic device capable of requesting and receiving resources, such as documents, over the network 102. Example user devices 104 include personal computers, mobile communication devices, and other devices that can send and receive data over the network 102. A user device 104 typically includes a user application, such as a web browser, to facilitate the sending and receiving of data over the network 102. The web browser can enable a user to display and interact with text, images, videos, music, web applications, and other information typically located on a web page at a website.

A document system 108 communicates with one or more user devices 104 to provide the user devices 104 with access to documents, e.g., by providing a document editing application interface. For example, the document system 108 could be an e-mail server that provides an e-mail interface through which user devices 104 read and write e-mails, or a cloud word processing server that provides an interface through which user devices 104 create, modify, and share word processing documents, presentations, and spreadsheets.

A suggestion system 110 provides suggestions for inclusion in a document. For example, the suggestion system 110 may receive textual input from a user device, and the suggestion system 110 can use the textual input to determine whether to provide a suggestion and, if so, identify suggested text to provide to the user device. The suggestion system 110 may receive textual input from the document system 108 or, in some implementations, directly from a user device.

Document data 112 is used to store data used by the document system 112 and may include, for example, document files, user data, and performance measures. The suggestion data 114 is used to store data used by the suggestion system 110 and may include, for example, an index of suggestions, suggestion model training data, and performance measures for suggestions. Other information may also be stored in the document data 112 and/or the suggestion data 114. While the storage devices are depicted separately in the example environment 100, in some implementations some or all of the document data 112 and suggestion data 114 may be combined or stored separately in other data storage devices.

Similarly, while the document system 108 and suggestion system 110 are depicted separately from one another, in some implementations they may be part of the same system. For example, the suggestion system 110 could be a component of the document system 108. In some implementations, the document system 108 or a portion thereof, such as a document editing application, may be included on a user device. For example, a document editing application running locally on a user device may communicate with a document system 108 and/or suggestion system 110 through the network 102.

Figure 2:
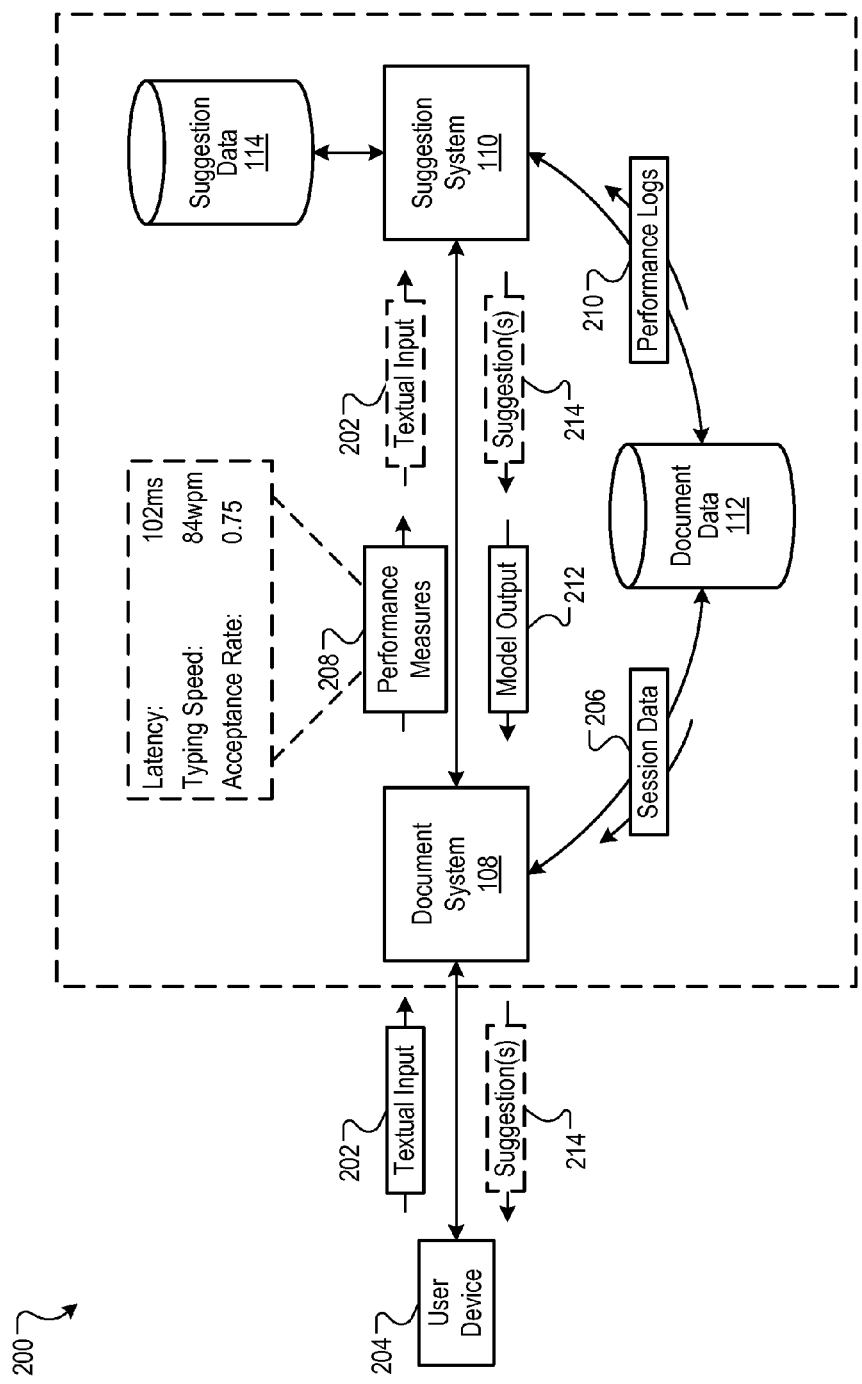
FIG. 2 is an illustration of an example process for providing suggestions within a document.

FIG. 2 is an illustration of an example process 200 for providing suggestions within a document. The document system 108 receives textual input 202 from a user device 204. For example, the document system 108 may be an e-mail server that provides a document editing application that the user device 204 uses to draft an e-mail, and the textual input 202 may be text that the user device provides for inclusion in the body of the e-mail, e.g., textual input for the body of an e-mail may be, "I am going to join Jon and his wi." In some implementations, the document for which the textual input 202 is provided includes prior text that was previously included in the document, e.g., entered earlier in that drafting session by the user device 204, included in the e-mail automatically as one or more prior e-mails in an e-mail thread, or saved in a draft e-mail created during a previous editing session.

The document system 108 uses session data 206 for the current editing session of the user device 204 to identify performance measures 208. The session data includes data related to the textual input and also for prior text in the document, e.g., obtained from document data 112. In some implementations, the session data 206 includes a log for the current editing session of the user device 204. The logs may include, for example, entries for each time the document was edited, including: the type of edit, the latency between the user device 204 and the document system 108, and a timestamp for the edit. The logs included in the session data 206 may also specify when previous suggestions were provided to the user device 204, and whether or not the suggestions were accepted. By way of example, session data 206 for an e-mail being drafted by the user device 204 may include a log with entries for each character added or removed to the e-mail, including entries for the textual input, e.g., "I am going to join Jon and his wi."

Using the session data 206, the document system identifies the performance measures 208 for the current editing session. In the example process 200, the example performance measures 208 are: latency of 102 milliseconds (ms), a typing speed of 24 words per minute (wpm), and an acceptance rate of 0.75, e.g., a number of suggestions accepted per suggestions provided, on a scale of 0 to 1.

The performance measures 208 are provided to the suggestion system 110 to determine whether suggestions should be provided, and if so, under what circumstances. The suggestion system 110 determines whether suggestions for the current editing session should be throttled using the performance measures 208 and a suggestion model that was trained using historical performance measures identified in performance logs 210 of historical document editing sessions of multiple users.

Each of the performance logs 210 includes historical performance measures for a historical document editing session, such as latency, typing speed, suggestion confidence scores for suggestions presented, and a suggestion acceptance rate. In some implementations, the suggestion model is trained by identifying relations between latency and acceptance rate, typing speed and acceptance rate, and suggestion confidence score to suggestion acceptance rate. Other model relations may also be used to train the model, such as a relation between a rate of prior of suggestion acceptance and a rate of later suggestion acceptance, e.g., how does declining or accepting suggestions early in a document affect the rate at which later-presented suggestions are accepted.

In some implementations, training the suggestion model includes determining a relation between a user typing speed and a rate of suggestion acceptance. For example, users who type slowly may be more likely to see, read, and accept suggestions than users who type quickly; users who type quickly may not see the suggestion or may be typing too quickly to read and accept a presented suggestion.

In some implementations, training the suggestion model includes determining a relation between user device latency and a rate of suggestion acceptance. User device latency measures the delay in communications between the user device 204 and one or more other systems, such as the document system 108 and/or the suggestion system. For example, a user device with low latency, e.g., 80 ms, will be presented with suggestions faster than a user device with high latency, e.g., 1,000 ms. Latency may affect how quickly suggestions are presented at a user device, which may in turn affect how often they are presented and/or accepted. A low latency may also lead to performance problems, which may reduce the desirability of providing suggestions. For example, in a cloud computing environment, user devices with high latency will experience a delay between actions performed on the user device and responses from the document system, and providing suggestions may further exacerbate the delay.

In some implementations, the suggestion model is trained by determining a relation between a suggestion confidence score and a rate of historical suggestion acceptance. Suggestions provided by the suggestion system 110 may have a corresponding confidence score that indicates a measure of confidence that the suggestion will be accepted by a user. Suggestions with high suggestion confidence scores may, for example, be more likely to be accepted than suggestions with low confidence scores.

In some implementations, the suggestion model is trained by determining a relation between a rate of prior suggestion acceptance and a rate of later suggestion acceptance. For example, the rate at which a user accepts suggestions in the first portion of a document may correlate with the rate at which the user accepts suggestions presented in later portions of the document, e.g., if a user is accepting every suggestion provided, the user may be likely to accept suggestions presented later in the editing session for the same document as well, while a user declining most suggestions provided early in a document editing suggestion may be likely to ignore or decline suggestions presented later.

Combinations of one or more of the foregoing historical performance measures may be used to train the suggestion model used to determine whether and how suggestions should be throttled. Other performance measures and relations may also be used, alone or in combination with those described above, to train the suggestion model.

The model output 212 produced by the suggestion model indicates the manner in which textual suggestions are throttled. As noted above, throttling suggestions may include, for example, reducing or increasing the likelihood that a textual suggestion will be provided for the current editing session or preventing textual suggestions from being provided at all. Throttling may also include adjusting confidence scores for suggestions or, in situations where confidence score thresholds are used to determine whether a suggestion should be provided, raising or lowering a confidence score threshold.

For example, in implementations where the session specific performance measures 208 include user device 204 latency, the output of the suggestion model may be a latency threshold that must be met before any suggestions are provided. For example, the suggestion system 110 may determine, based on the performance logs 210, that user devices with latency greater than 1,000 ms should not receive suggestions. If the performance measures 208 indicated latency greater than 1,000 ms, the suggestions system 110 or suggestion model may provide model output 212 to the document system indicating that the user device 204 should not request or receive textual suggestions until the latency for the user session drops below 1,000 ms.

As noted above, in some implementations, each suggestion 214 identified by the suggestion system 110 based on the textual input 202 includes a confidence score. In these implementations, the model output 212 produced by the suggestion model may be a confidence score threshold, and suggestions 214 are throttled by only providing suggestions 214 having a confidence score greater than the threshold. For example, model output may indicate a relatively high confidence score threshold for user devices with high latency, and a relatively low confidence score threshold for user devices with low latency.

In some implementations, as in the example process 200, the session specific performance measures 208 may include a rate of suggestion acceptance for suggestions that were previously provided to the user device 204 during the current document editing session, and a confidence score threshold provided by the suggestion model may depend on the rate of acceptance for previous suggestions. For example, the model output 212 may specify a low confidence score threshold if the user is accepting most suggestions provided during the current editing session, which may lead to an increase in the number of suggestions provided.

In some implementations, as in the example process 200, the session specific performance measures 208 may include a user typing speed, and the suggestion model may provide a typing speed threshold as model output 212, e.g., instead of or in addition to a confidence score threshold. As with the latency threshold, a typing speed threshold may prevent suggestions from being provided as long as the user's typing speed meets the typing speed threshold. In some implementations, the number of suggestions provided may be reduced or increased as the user's typing speed changes. For example, users who type quickly may see fewer suggestions than users who type slowly.

Other methods or combinations of methods, in addition to those described above, may be used to throttle textual suggestions. The suggestion model may receive multiple performance measures 208 as input to a single suggestion model, or may use separately trained models with individual performance measures being input to each, with the results being combined. For example, the suggestion model that receives latency input may produce model output 212 indicating that the frequency or likelihood of suggestions 214 should be increased for a latency of 102 ms, while the suggestion model that receives typing speed input may produce model output 212 indicating that the frequency or likelihood of suggestions 214 should be decreased for a typing speed of 84 wpm or greater.

In some implementations, the model output 212 used to make adjustments affecting the frequency, or likelihood, or suggestions 214 being provided may be used for an entire user editing session, or may be updated periodically and/or on demand, e.g., with each new request for a suggestion. In addition, the performance measures 208 may be measured and re-measured periodically, or on demand. For example, the performance measures may be updated every second, every 10 seconds, after every suggestion, or after receiving N keystrokes as input from the user device, where N is a positive integer. In addition, the suggestion model may, in some implementations, be periodically retrained using different performance logs 210.

In some implementations, a user may be provided with an opportunity to control the throttling of suggestions. For example, a user may have preferences indicating how frequently the user wishes to see suggestions. Preferences may be context specific, e.g., resulting in different preferences for different devices, applications, locations, etc. Preferences can affect, for example, the sensitivity of suggestions, e.g., by adjusting a threshold confidence score for delivering suggestions, and the frequency of suggestions, e.g., by turning suggestions off for a particular user device.

In some implementations, other indicators may be used to determine whether or not suggestions 214 should be provided to the user device 204. For example, a determination may be made based on the content of the textual input, e.g., by determining that the textual input includes a misspelling, determining that the textual input includes a reference to an entity known to the suggestion system 110, or determining that the textual input includes a special character or combination of characters designed to trigger a suggestion.

The suggestion system 110 may use the textual input 202 and one or more suggestion models, such as a general suggestion model, to identify the actual suggestion(s) 214 to be provided to the user device 204. For example, a general suggestion model is a model that has been trained, based on text included in historical documents, to identify textual suggestions for completing a word, phrase, sentence, paragraph, etc. based on textual input 202. For example, given the textual input 202 of "I am going to join Jon and his wi," the general suggestion model may provide one or more general suggestions 214, such as "wife" or "wildlife."

In some implementations, the general suggestion model also provides a confidence score for each general suggestion. For example, a confidence score for the suggestion "wife" may be based on how often other words beginning with "wi" turned out to be "wife." If "wife" is more common in historical text than "wildlife," then the confidence score of "wife" may be higher than the confidence score for "wildlife." Many other methods, or combinations of methods, may be used to determine confidence scores for completions. In some implementations, partial or complete phrase matches, rather than the most recent word or characters, may be used to identify general suggestions and measure their confidence, e.g., having the pronoun "his" before "wi" may increase the confidence score for "wife" relative to "wildlife" if historical instances of "his wife" are more common than "his wildlife."

Many different methods or combination of methods may be used to determine which suggestions identified by the suggestion system 110 should be provided to the user device 202. In implementations where the suggestions have confidence scores, the suggestion with the highest confidence score may be selected for presentation. In some implementations, the suggestions 214 may be ranked according to their confidence scores and the top N are selected for presentation, where N is a positive integer. As noted above, one or more thresholds may be used in some implementations, e.g., suggestions may only be selected if their respective confidence scores meet a confidence score threshold.

As depicted in the example process 200, the selected suggestion(s) 214 may be provided to the user device 204. For example, the document system 108 may cause a document editing application to present selectable suggestion(s) 214 to the user, as in a drop-down list, or it may replace existing characters of the document with a suggestion and a notification regarding the replacement.

While various components, such as the document system 108 and suggestion system 110, are depicted separately in the illustration of the example process 200, the components may be included in a single system, as shown by the dotted line encompassing the components, or a different combination of systems than the depicted combination. In addition, the storage devices depicted may be combined, and may also be stored, in whole or in part, separately from the system that provides suggestions.

Figure 3:
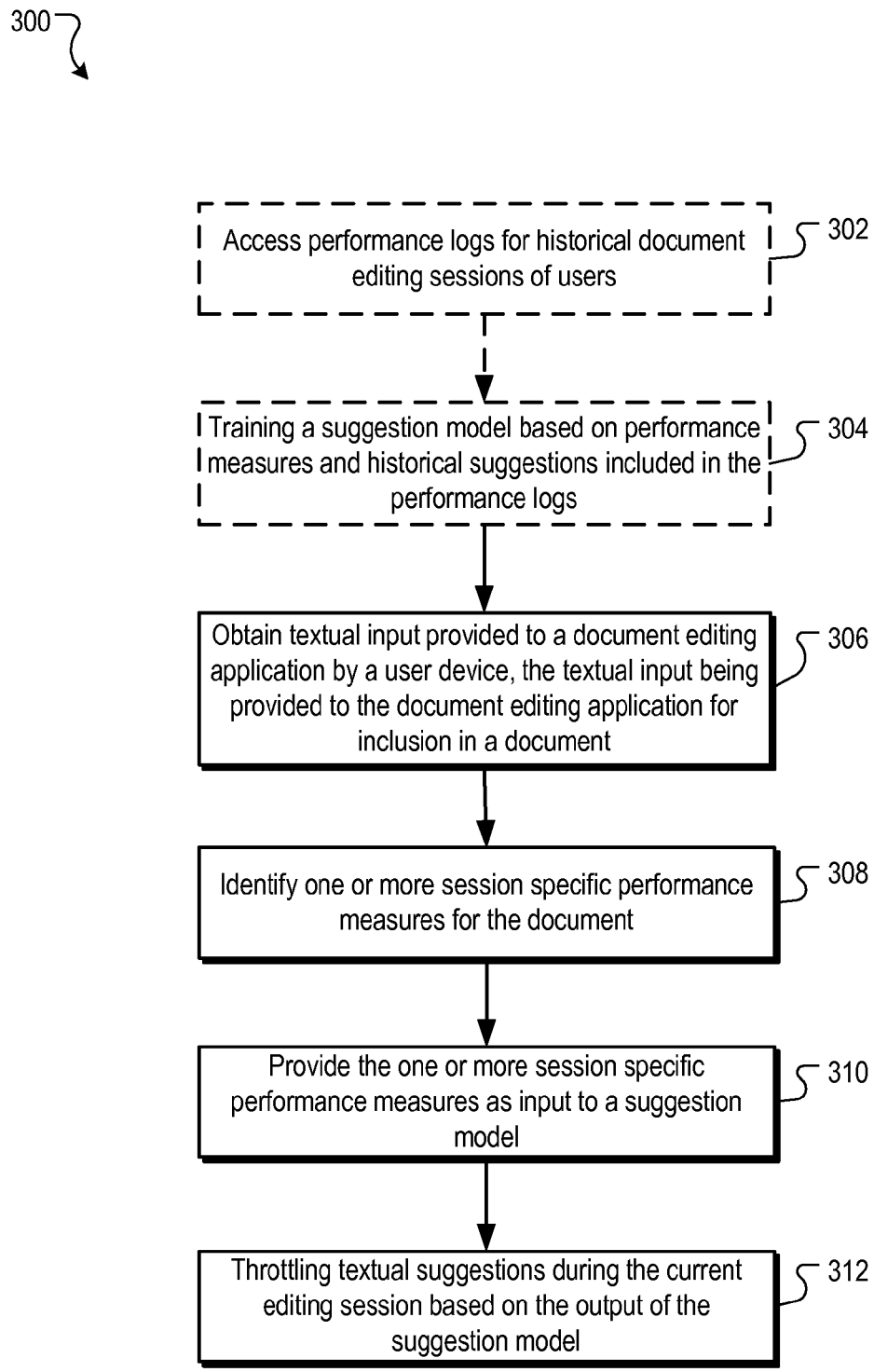
FIG. 3 is a flow diagram of an example process in which suggestions are provided for a document.

FIG. 3 is a flow diagram of an example process 300 in which suggestions are provided for a document. The process 300 may be performed by a suggestion system, such as the system described above with reference to FIG. 2. Process steps 302 and 304 may be performed prior to query time, such as during model training.

In some implementations, performance logs are accessed for historical document editing sessions of users (302). Each performance log includes performance measures for a historical document editing session. For example, a performance log for a word processing document may include information indicating how fast the user drafting the document was typing at any given time, how many suggestions were provided and accepted, and a latency of the connection at any given time.

In some implementations, a suggestion model is trained based on the performance measures and historical suggestions included in the performance logs (304). Training the suggestion model may include determining, based on the performance measures and historical suggestions included in the performance logs, a relation between a user typing speed and a rate of historical suggestion acceptance. The suggestion model may then be trained based on the relation. For example, the suggestion model may be trained to decrease the likelihood of suggestions being provided as typing speed increases.

In some implementations, training the suggestion model includes determining, based on the performance measures and historical suggestions included in the performance logs, a relation between a user device latency and a rate of historical suggestion acceptance. The suggestion model may then be trained based on this relation. For example, the suggestion model may be trained to decrease the likelihood or frequency of providing suggestions as latency increases.

In some implementations, training the suggestion model includes determining, based on the performance measures and historical suggestions included in the performance logs, a relation between a suggestion confidence score and a rate of historical suggestion acceptance. The suggestion model may then be trained based on this relation. For example, the suggestion model may be trained to determine a threshold confidence score for providing a suggestion, and suggestions must have a confidence score that meets the threshold in order to be provided to a user device.

In some implementations, training the suggestion model includes determining, based on the performance measures and historical suggestions included in the performance logs, a relation between a rate of prior suggestion acceptance and a rate of later suggestion acceptance. The suggestion model may then be trained based on this relation. For example, the model may be trained to determine a measure of confidence that a suggestion will be accepted based on the rate at which previous suggestions for the same document were accepted.

Textual input provided to a document editing application by a user device, during a current editing session, is obtained (306). The textual input is provided to the document editing application for inclusion in a document. For example, the document editing application may be a word processing document editing application, and the textual input may be text recently entered by a user device, e.g., the previous N words, where N is a positive integer, or the words entered since the last punctuation mark.

One or more performance measures are identified for the document during the current editing session (308). Each performance measure is based on session data obtained from the user device, the session data being for the textual input and prior text that was included in the document prior to the textual input. For example, in some implementations the performance measures may include one or more of a user typing speed, a user device latency, and/or a rate of suggestion acceptance that specifies a rate of acceptance for previous suggestions that were provided during the current editing session for the prior text that was included in the document prior to the textual input. The document session from which session data is obtained may, in some implementations, be the current editing session. For example, the user typing speed, user device latency, and/or rate of suggestions acceptance may each be for the current user session.

The one or more performance measures are provided as input to a suggestion model (310). The suggestion model has been trained using historical performance measures identified in performance logs for historical document editing sessions of users. For example, performance logs may be maintained for a large collection of word processing documents drafted by various users. As described above, the information included in the performance logs, such as user typing speed, latency, document changes, and suggestions provided and accepted, may have been used to train the suggestion model.

Textual suggestions are throttled during the current editing session based on the output of the suggestion model (312). Each textual suggestion includes one or more words to be suggested for inclusion in the document. In some implementations, each textual suggestion has a suggestion confidence score indicating a likelihood that the textual suggestion will be included in the document, the output of the suggestion model is a confidence score threshold, and throttling the textual suggestions includes providing a textual suggestion to a user device only in response to the textual suggestion having a suggestion confidence score that meets the confidence score threshold. For example, a user may begin typing a sentence as follows: "The main character of the New Awesome Movie is played by." A suggestion system may identify an individual, e.g., "John Doe," as a suggestion, with a confidence score of 0.90 (on a scale of 0 to 1). If a confidence score threshold is 0.80, the suggestion meets the confidence score threshold and is eligible to be provided to the user device, while a confidence score threshold of 0.95 would make the suggestion ineligible for provision to the user device. The confidence score may, in some implementations, depend at least in part on characters in a prefix typed by a user. For example, the confidence score for "John Doe" in the previous example may be higher if the user input includes additional characters, e.g., "The main character of the New Awesome Movie is played by Joh" may result in a higher confidence score for "John Doe" than "The main character of the New Awesome Movie is played by."

In some implementations, the one or more performance measures include a rate of acceptance for previous suggestions that were provided during the current editing session for the prior text that was included in the document prior to the textual input. The confidence score threshold provided by the suggestion model may depend on the rate of acceptance for previous suggestions. For example, if the user providing the textual input, "The main character of the New Awesome Movie is played by," was previously presented with 10 suggestions during the same document editing session for the same document, the number of suggestions accepted by the user may affect the confidence score threshold. For example, if the user accepted all 10 suggestions, this may indicate that the user finds the suggestions useful, and the suggestion threshold may be decreased to allow for more suggestions to be eligible to be provided to the user device. On the other hand, if the user declined all 10 previous suggestions, this may indicate that the user does not find the suggestions useful, and the suggestion threshold may be increased to ensure that only suggestions with high confidence scores are provided to the user device.

In some implementations, the one or more performance measures include a user device latency that specifies a communications delay between the user device and the document editing application. The output of the suggestion model may be a latency threshold, and throttling textual suggestions may include providing textual suggestions to the user device only in response to the user device latency meeting the latency threshold. For example, if a user device has a high latency, identifying and providing suggestions may be delayed, and the user may find these delays unhelpful. In these situations, a latency threshold may be used to prevent suggestions from being provided unless and until the user device latency is less than the threshold latency.

In some implementations, the one or more performance measures includes a user typing speed that specifies a speed at which the user device provides textual input to the document editing application. The output of the suggestion model may be a typing speed threshold, and throttling the textual suggestions may include providing textual suggestions to the user device only in response to the user typing speed meeting the typing speed threshold. For example, users who type quickly may be less likely to read and accept suggestions, as they may type faster than suggestions can be presented and read. In these situations, a typing speed threshold may be used to prevent suggestions from being provided to the user. If and when the user typing speed decreases, suggestions may then be provided to the user device. In addition, the frequency of suggestions may be increased as typing speed decreases, which may improve productivity of slow typing users.

In some implementations, the document editing application is one of multiple document editing applications, and the suggestion model was trained using historical performance measures identified in performance logs for that particular document editing application. In addition, different suggestion models may be used for different document editing applications. For example, an e-mail authoring application may have a suggestion model trained using e-mail documents and used for e-mail documents, and that e-mail suggestion model may be different from suggestion model for a word processing document drafting application. In some implementations, other context-dependent models and/or model inputs may be used to determine whether suggestions will be provided for various contexts. For example, the hardware or software used for providing input may affect the provision of suggestions, e.g., a model used for textual input provided using swipe-typing software may be different from a model used for textual input provided using a physical keyboard.

Figure 4:
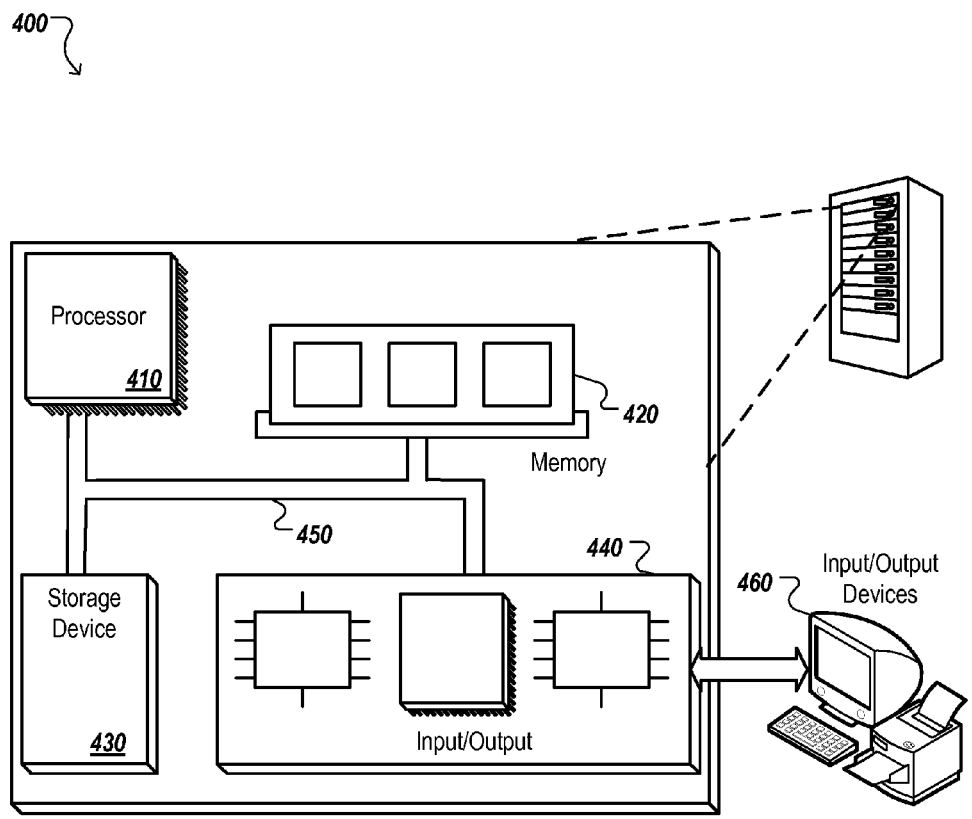
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method implemented by data processing apparatus, the method comprising:
   obtaining, during a current editing session, textual input provided to a document editing application by a user associated with a user device, the textual input being provided to the document editing application for inclusion in a document;
   receiving textual suggestions from a suggestion model based on the obtained textual input, each textual suggestion comprising one or more words to be suggested for inclusion in the document, each textual suggestion having a confidence score;
   providing, during the current editing session and not to the user, respective textual suggestions having confidence scores above a current threshold value;
   identifying, during the current editing session, one or more performance measures associated with the current editing session for the document, each performance measure being at least one of a typing speed of the user or a latency of the user device based on session data obtained during a document editing session, the session data being for the obtained textual input and prior texts included in the document prior to the obtained textual input;
   providing the one or more performance measures as input to the suggestion model that was trained using historical performance measures identified in performance logs for a plurality of historical document editing sessions of a plurality of users prior to the current editing session;
   generating a modified threshold value based on the inputted one or more performance measures, the modified threshold value different from the current threshold value; and
   throttling the textual suggestions during the current editing session by providing, during the current editing session and to the user, at least one of the respective textual suggestions having a confidence score above the modified threshold value.

2. The method of claim 1, further comprising:
   training the suggestion model based on the historical performance measures and historical suggestions included in the performance logs.

3. The method of claim 2, wherein the training the suggestion model comprises:
   determining, based on the historical performance measures and the historical suggestions included in the performance logs, a relation between the user's typing speed and a rate of historical suggestion acceptance; and
   training the suggestion model based on the determined relation.

4. The method of claim 2, wherein the training the suggestion model comprises:
   determining, based on the historical performance measures and the historical suggestions included in the performance logs, a relation between the user device's latency and a rate of historical suggestion acceptance; and training the suggestion model based on the determined relation.

5. The method of claim 2, wherein the training the suggestion model comprises:
determining, based on the historical performance measures and the historical suggestions included in the performance logs, a relation between a suggestion confidence score and a rate of historical suggestion acceptance; and
training the suggestion model based on the determined relation.

6. The method of claim 1, wherein the one or more performance measures further comprise:
a rate of suggestion acceptance that specifies a rate of acceptance for previous suggestions that were provided during the plurality of historical document editing sessions.

7. The method of claim 1, wherein:
the one or more performance measures further comprise a rate of acceptance for previous suggestions that were provided during the plurality of document editing sessions; and
the modified threshold provided by the suggestion model depends on the rate of acceptance for previous suggestions.

8. The method of claim 1, wherein:
the user device's latency specifies a communications delay between the user device and the document editing application;
the threshold values of the suggestion model is associated with a latency threshold; and
the throttling textual suggestions comprises providing textual suggestions to the user device only in response to the user device latency meeting the latency threshold.

9. The method of claim 1, wherein:
the user's typing speed specifies a speed at which the user device provides the obtained textual input to the document editing application;
the threshold values of the suggestion model is associated with a typing speed threshold; and
the throttling textual suggestions comprises providing the textual suggestion to the user device only in response to the user's typing speed meeting the typing speed threshold.

10. The method of claim 1, wherein the document editing application is one of a plurality of document editing applications, and the suggestion model was trained using respective historical performance measures identified in respective performance logs for the document editing application.

11. The method of claim 1, wherein the document editing session from which session data is obtained is the current editing session.

12. A system comprising:
one or more data processing apparatus implemented at least partially by hardware; and
a data storage device storing instructions that, when executed by the one or more data processing apparatus, cause the one or more data processing apparatus to perform operations comprising:
obtaining, during a current editing session, textual input provided to a document editing application by a user associated with a user device, the textual input being provided to the document editing application for inclusion in a document;
receiving textual suggestions from a suggestion model based on the obtained textual input each textual suggestion comprising one or more words to be suggested for inclusion in the document, each textual suggestion having a confidence score;
providing, during the current editing session and not to the user, respective textual suggestions having confidence scores above a current threshold value;
identifying, during the current editing session, one or more performance measures associated with the current editing session for the document, each performance measure being at least one of a typing speed of the user or a latency of the user device based on session data obtained during a document editing session, the session data being for the obtained textual input and prior texts included in the document prior to the obtained textual input;
providing the one or more performance measures as input to the suggestion model that was trained using historical performance measures identified in performance logs for a plurality of historical document editing sessions of a plurality of users prior to the current editing session;
generating a modified threshold value based on the inputted one or more performance measures, the modified threshold value different from the current threshold value; and
throttling the textual suggestions during the current editing session by providing, during the current editing session and to the user at least one of the respective textual suggestions having a confidence score above the modified threshold value.

13. The system of claim 12, wherein the operations further comprise:
training the suggestion model based on the historical performance measures and historical suggestions included in the performance logs.

14. The system of claim 13, wherein the training the suggestion model comprises:
determining, based on the historical performance measures and the historical suggestions included in the performance logs, a relation between the user's typing speed and a rate of historical suggestion acceptance; and
training the suggestion model based on the determined relation.

15. The system of claim 13, wherein the training the suggestion model comprises:
determining, based on the historical performance measures and the historical suggestions included in the performance logs, a relation between the user device's latency and a rate of historical suggestion acceptance; and
training the suggestion model based on the determined relation.

16. The system of claim 13, wherein the training the suggestion model comprises:
determining, based on the historical performance measures and the historical suggestions included in the performance logs, a relation between a suggestion confidence score and a rate of historical suggestion acceptance; and
training the suggestion model based on the determined relation.

17. The system of claim 12, wherein the one or more performance measures further comprise:

a rate of suggestion acceptance that specifies a rate of acceptance for previous suggestions that were provided during the plurality of historical document editing sessions.

18. A non-transitory computer-readable medium comprising instructions that, when executed by one or more data processing apparatus, cause the one or more data processing apparatus to perform operations comprising:

obtaining, during a current editing session, textual input provided to a document editing application by a user associated with a user device, the textual input being provided to the document editing application for inclusion in a document;

receiving textual suggestions from a suggestion model based on the obtained textual input, each textual suggestion comprising one or more words to be suggested for inclusion in the document, each textual suggestion having a confidence score;

providing, during the current editing session and not to the user, respective textual suggestions having confidence scores above a current threshold value;

identifying, during the current editing session, one or more performance measures associated with the current editing session for the document, each performance measure being at least one of a typing speed of the user or a latency of the user device based on session data obtained during a document editing session, the session data being for the obtained textual input and prior texts included in the document prior to the obtained textual input;

providing the one or more performance measures as input to the suggestion model that was trained using historical performance measures identified in performance logs for a plurality of historical document editing sessions of a plurality of users prior to the current editing session;

generating a modified threshold value based on the inputted one or more performance measures, the modified threshold value different from the current threshold value; and throttling the textual suggestions during the current editing session by providing, during the current editing session and to the user at least one of the respective textual suggestions having a confidence score above the modified threshold value.

* * * * *

UNITED STATES PATENT AND TRADEMARK OFFICE
CERTIFICATE OF CORRECTION

| | | |
|---|---|---|
| PATENT NO. | : 9,959,296 B1 | Page 1 of 1 |
| APPLICATION NO. | : 14/275333 | |
| DATED | : May 1, 2018 | |
| INVENTOR(S) | : Gubin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this
Sixth Day of December, 2022

Katherine Kelly Vidal
*Director of the United States Patent and Trademark Office*